Patented Sept. 6, 1932

1,875,924

UNITED STATES PATENT OFFICE

GEORGE FREDERICK HORSLEY, OF STOCKTON-ON-TEES, ENGLAND, ASSIGNOR TO IMPERIAL CHEMICAL INDUSTRIES LIMITED, OF WESTMINSTER, LONDON, ENGLAND, A BRITISH COMPANY

PROCESS FOR SEPARATING AND RECOVERING OLEFINES FROM GASES CONTAINING SAME

No Drawing. Application filed March 21, 1928, Serial No. 263,597, and in Great Britain March 30, 1927.

The present invention relates to a process for separating and recovering olefines, particularly ethylene, from gases containing the same.

It is peculiarly well adapted to separating ethylene from mixtures with or containing carbon monoxide. These gases are both absorbed by cuprous solutions so that hitherto an expensive and complicated liquefaction process was necessary to separate the two gases.

According to the present invention I separate ethylene and carbon monoxide mixtures, such as occur in coal gas by scrubbing the gas, previously freed from sulphur compounds, under ordinary or increased pressure, with an acid solution of silver nitrate, which absorbs the ethylene only, and recovering the ethylene by heating with or without reduction of pressure.

According to a further feature of the invention, I remove ethylene from gases by scrubbing them with an acid solution of silver nitrate in a tower made of resistant steel alloy.

The steel alloy I prefer to use is one containing 8% of nickel and 18% of chromium. An acid solution of a strength equal to 0.3 N nitric acid is employed. If the solution is less acid than this, metallic silver is precipitated, presumably by the reducing action of hydrogen and/or carbon monoxide. There is also a tendency to the formation of silver acetylide unless the solution is kept acid (if the initial gases contain any acetylene). Too strong acid should not be used as it will oxidize the gases to carbon dioxide.

The process should be conducted with solutions containing at least about 200 gms. of silver nitrate per litre.

The process is conducted in towers and the exit gas must be scrubbed with water so as to catch spray, otherwise serious loss of silver nitrate would occur.

The process is illustrated in the following examples:—

Example 1

A gas mixture containing 16 per cent ethylene is scrubbed in a tower made of nickel-chromium steel with a solution of silver nitrate containing 200 gms. of silver nitrate and 19 gms. of nitric acid per litre. The tower is preferably constructed of special steel containing 8% of nickel and 18% of chromium and the temperature and pressure are atmospheric. The solution containing dissolved ethylene is regenerated by heating to 50°—70° C. when a gas containing 99% of ethylene is obtained.

Example 2

Coal distillation gases continuing 5 per cent of ethylene and about 5 per cent of carbon monoxide are freed from ammonia and sulphur compounds in any suitable manner and from tarry matter and heavy hydrocarbons by scrubbing with oil under pressure. The gas may then be further compressed to say 100 atmospheres and is then treated with an aqueous solution of silver nitrate containing 50 gms. of silver nitrate per 100 gms. of solution and 0.3 N with respect to nitric acid at a temperature of from 0°—10° C. The silver nitrate solution is then collected in a regenerating vessel where it is subjected to heat, with or without previous release of the pressure. A combined heat treatment and pressure reduction is especially effective in regenerating the olefine gas from the solution, but it is not in all cases necessary to diminish the pressure to atmospheric, and it may be advantageous to collect the concentrated olefines at any pressure at which they are given off freely from the solution. The solution of silver nitrate which has been freed from olefines is used for absorbing fresh quantities of gas.

The extent to which olefine gases are taken up by the solution of silver salt is approximately proportional to the amount of silver in the solution, and also to the partial pressure of the olefines in the gaseous mixture treated. Absorption proceeds better at low temperatures, and regeneration may be effected at say 50—70° C. Heat exchangers may be used to heat the solution charged with olefines and to cool down the regenerated solution for further use.

It is preferred to employ gases which have been freed from any matter liable to contaminate the silver nitrate solution, as the process works better with clean gases. Hydrogen sulphide and other sulphur compounds must be absent.

I declare that what I claim is:—

1. Process of removing olefines from gases which comprises scrubbing the gases in a tower made of alloy steel, with an acid solution of silver nitrate to absorb the olefines, and regenerating said solution and recovering olefines therefrom by heating same.

2. Process of removing olefines from gases which comprises compressing said gases scrubbing them while under superatmospheric pressure in a tower made of alloy steel, with an acid solution of silver nitrate to absorb the olefines, releasing the pressure on said solution and regenerating same and recovering olefines therefrom by heating same.

3. Process of removing olefines from gases which comprises scrubbing the gases with an acid solution of silver nitrate containing at least about 200 grams of silver nitrate per litre, and about 0.3 N with respect to nitric acid to absorb the olefines, and regenerating said solution and recovering olefines therefrom by heating same.

4. Process of removing olefines from gases which comprises scrubbing the gases with an acid solution of silver nitrate which has been cooled to 0—10° C. to absorb the olefines and regenerating said solution, and recovering olefines therefrom by heating same to 50—70° C.

5. Process of removing olefines from gases which comprises scrubbing the gases in a tower with an acid solution of silver nitrate, washing the gases on their exit from the tower with water to recover any silver nitrate carried over as spray, and regenerating said solution and recovering olefines therefrom by heating same.

In witness whereof, I have hereunto signed my name this 8th day of March 1928.

GEORGE FREDERICK HORSLEY.